(12) United States Patent
Terrell et al.

(10) Patent No.: US 6,705,599 B2
(45) Date of Patent: Mar. 16, 2004

(54) LIVESTOCK COOLING APPARATUS

(76) Inventors: Michael E. Terrell, 3801 Barberry Pl., Chandler, AZ (US) 85248; Frank Gilbert Marks, 3340 S. 107th Ave., Tolleson, AZ (US) 85353

(*) Notice: Subject to any disclaimer, the term of this patent is extended or adjusted under 35 U.S.C. 154(b) by 0 days.

(21) Appl. No.: 10/279,570

(22) Filed: Oct. 23, 2002

(65) Prior Publication Data

US 2003/0064678 A1 Apr. 3, 2003

Related U.S. Application Data

(63) Continuation-in-part of application No. 09/967,678, filed on Sep. 28, 2001, now Pat. No. 6,578,828.

(51) Int. Cl.[7] .................................................. B01F 3/04
(52) U.S. Cl. .......................... 261/30; 119/436; 415/125
(58) Field of Search ............................ 119/436; 261/30, 261/79.2; 454/328, 337; 415/125

(56) References Cited

U.S. PATENT DOCUMENTS

| | | | |
|---|---|---|---|
| 2,794,591 A | * | 6/1957 | Rodriguez ..................... 74/42 |
| 3,556,327 A | * | 1/1971 | Garrison ...................... 56/344 |
| 4,443,387 A | | 4/1984 | Gordon |
| 4,476,809 A | | 10/1984 | Bunger |
| 4,693,852 A | | 9/1987 | Gordon |
| 5,747,883 A | | 5/1998 | Hammer et al. |
| 6,014,948 A | | 1/2000 | Gordon |
| 6,059,865 A | | 5/2000 | Poteat |
| 6,079,365 A | | 6/2000 | Medlin |
| 6,086,053 A | | 7/2000 | Natschke |
| 6,283,709 B1 | | 9/2001 | Hill et al. |
| 6,293,121 B1 | | 9/2001 | Labrador |
| 6,409,157 B1 | | 6/2002 | Lundin |
| 6,588,372 B1 | * | 7/2003 | Terrell et al. ............... 119/448 |

FOREIGN PATENT DOCUMENTS

NL 18474 8/1928

* cited by examiner

*Primary Examiner*—Harold Joyce
(74) *Attorney, Agent, or Firm*—James M. Duncan

(57) ABSTRACT

A livestock cooling apparatus comprising an electrically-powered fan, which is capable of oscillating 360 degrees. The apparatus may be used in conjunction with a programmable cooling system for livestock which allows each fan in the system to be programmed to sweep a designated area according to observed environmental conditions or according to the time of day. The cooling apparatus may further comprise a mist ring for injecting water into the airstream created by the fan to provide for evaporative cooling of the livestock.

21 Claims, 3 Drawing Sheets

LIVESTOCK COOLING APPARATUS

CROSS-REFERENCE TO RELATED APPLICATION

This is a second continuation-in-part of U.S. application Ser. No. 09/967,678, U.S. Pat. No. 6,578,828 filed on Sep. 28, 2001, to which the inventors claim domestic priority, and which is incorporated by reference herein.

BACKGROUND OF THE INVENTION

The present invention generally relates to devices and systems for sheltering livestock and more specifically to a livestock cooling fan which may be used in conjunction with a cooling system which implements programmable evaporative cooling devices to create an environment which protects the health and productivity of the animals.

It is known in animal agriculture to cool livestock with evaporative cooling by wetting the animal and then drying the animal through mechanical ventilation or via natural ventilation. It is also known to use fans to deliver air cooled by water to an area occupied by livestock. U.S. patent application Ser. No. 09/967,678, filed by the inventors herein, shows how fans may be interconnected or mechanically linked such that the fans oscillate together over a predetermined area for a given time of the day or for a specific set of conditions, where the system is capable of delivering cooling fog. This type of system creates an environment which is healthy for livestock, and may result in higher yields of milk for dairy cows.

The oscillation of a fan circuit within application Ser. No. 09/967,678 is programmable. The oscillation of a fan circuit can be concentrated in a particular degree range at certain times of the day to increase animal comfort. The speed at which each fan circuit oscillates is programmable through the entire range of oscillation. A faster oscillation speed may be desired in areas prone to wetting, such as free-stall beds. Alternatively, slower oscillation may be desired in other areas, such as over cement alleyways. Programming can be changed at any time to meet the individual preferences of the animal herds person. Water output can be varied according to a pre-programmed schedule or through constant monitoring of current environmental conditions. Current temperature, humidity and wind conditions may be monitored and water output controlled accordingly by a variable-frequency-drive on the high-pressure water pump. Water output may also be controlled by switching nozzle sizes, instead of or in addition to changing pump pressure output. In conjunction with programmable oscillation, programmable water output allows the herds person to fine tune the animal's environment for maximum economic gain and animal comfort.

However, the linkage mechanism used with the prior disclosed cooling system may include rigid linkage arms or cables which prevent each fan in the system from being capable of oscillating a complete 360 degrees. This limitation means there are "hot spots" where the fans are unable to provide cooling for the livestock. In addition, the linkage mechanisms may be overly complicated, resulting in increased cost, maintenance and/or downtime. A livestock cooling system is desired in which the cooling fans are able to oscillate a complete 360 degrees, where the connecting linkage is relatively simple.

SUMMARY OF THE INVENTION

The present invention is directed to a fan for a livestock cooling system, where the fan is capable of oscillating a complete 360 degrees through the use of simple linkage. The disclosed fan is adaptable to be used with previously disclosed cattle cooling systems which provide for programmable oscillation of circuits of fans. The disclosed fan may be configured to emit water at high pressure so as to result in flash evaporation of the extremely small water particles which come into contact with any warm surface such as the skin of an animal or person.

The disclosed livestock cooling apparatus comprises an electrically-powered fan, where the fan creates an air stream. The fan comprises a fan blade, a fan motor, and a fan enclosure. The fan blade is operably attached to the fan motor, and the fan blade and fan motor are mounted in the fan enclosure. The fan enclosure is attached to a fan yoke. The cooling apparatus further comprises a drive shaft having a first end and a second end. The first end of the drive shaft is coupled to the fan yoke. An attachment member attached to a first support means supports the fan enclosure. The attachment member has a top, a bottom, and an aperture extending through the attachment member from the top to the bottom. Bearing means are attached to the attachment member, where the bearing means are disposed within the aperture. The bearing means and aperture are adapted for receiving the drive shaft therethrough. A first pulley is attached to the second end of the drive shaft. Oscillation means are connected to the first pulley for rotating the fan through a plurality of rotational positions. The apparatus may include means for injecting water droplets into the air stream of the fan.

These and other features, aspects, and advantages of the present invention will become better understood with regard to the following description, appended claims, and accompanying drawings.

DETAILED DESCRIPTION OF THE EMBODIMENTS

Figure 1:
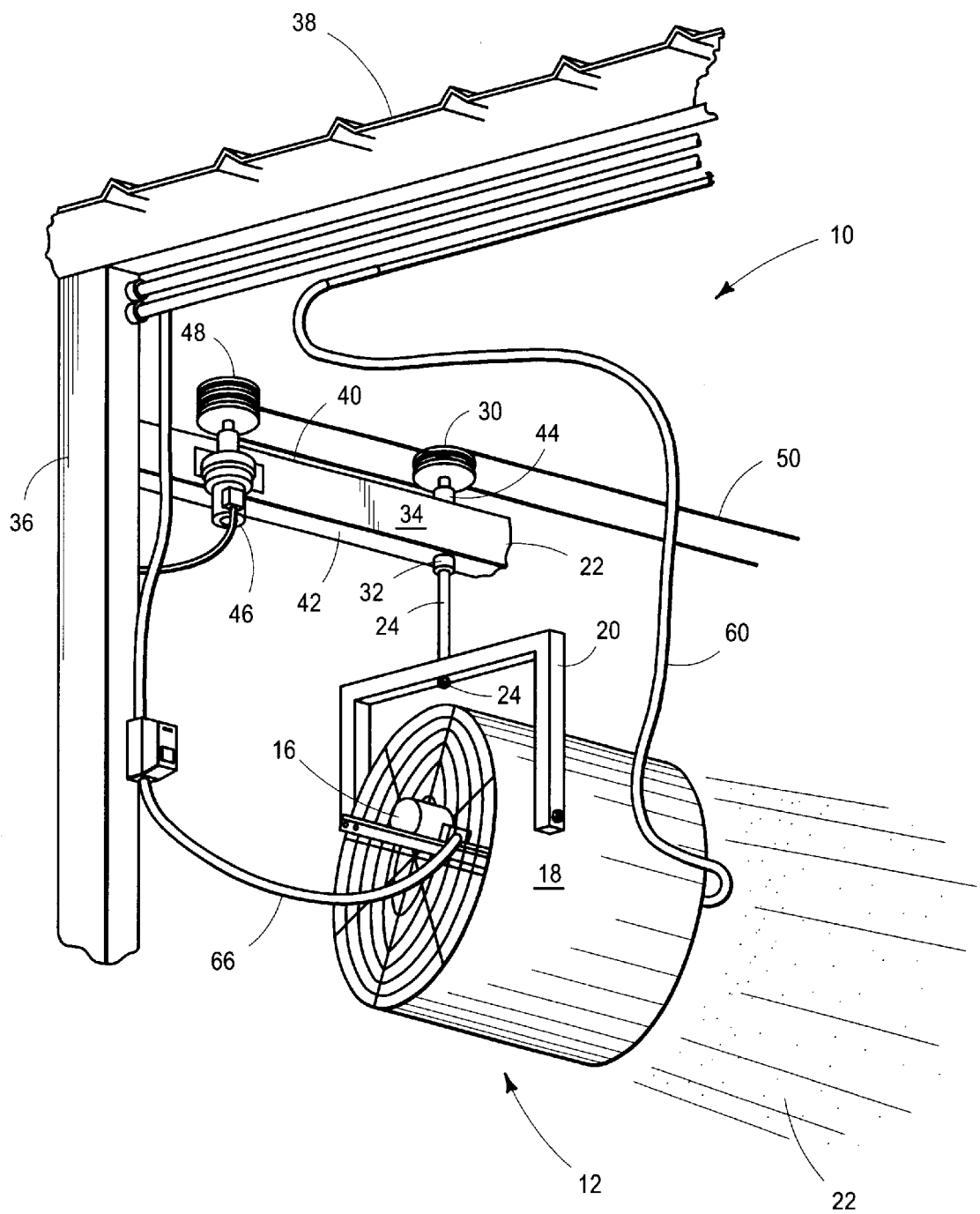
FIG. 1 is a perspective view of the disclosed livestock cooling fan.

Referring now specifically to the drawings, FIG. 1 shows the disclosed livestock cooling apparatus 10. The apparatus comprises an electrically-powered fan 12, the fan comprising a fan blade 14, a fan motor 16, and a fan enclosure 18. The fan blade 14 is operably attached to the fan motor 16. The fan motor 16 and the fan blade 14 are mounted in the fan enclosure 18. As shown in FIG. 1, the fan enclosure 18 is attached to a fan yoke 20. The fan yoke 20 may be attached to the outsides of the fan enclosure 18 as shown in FIG. 1, so that the fan enclosure is enclosed within the fan yoke 20. In this embodiment, the angle of the fan enclosure 18, and therefore the angle of the air stream 22 created by the fan, may be adjusted with respect to the ground, allowing the user to adjust the direction of the air stream. The fan yoke 20 may be constructed from square or rectangular steel stock and may be configured in the U-shape depicted in FIG. 1 and FIG. 2.

A drive shaft 24 is coupled to the fan yoke 20, the drive shaft having first end 26 which is coupled to the yoke, and second end 28 to which is attached a first pulley 30.

Figure 2:
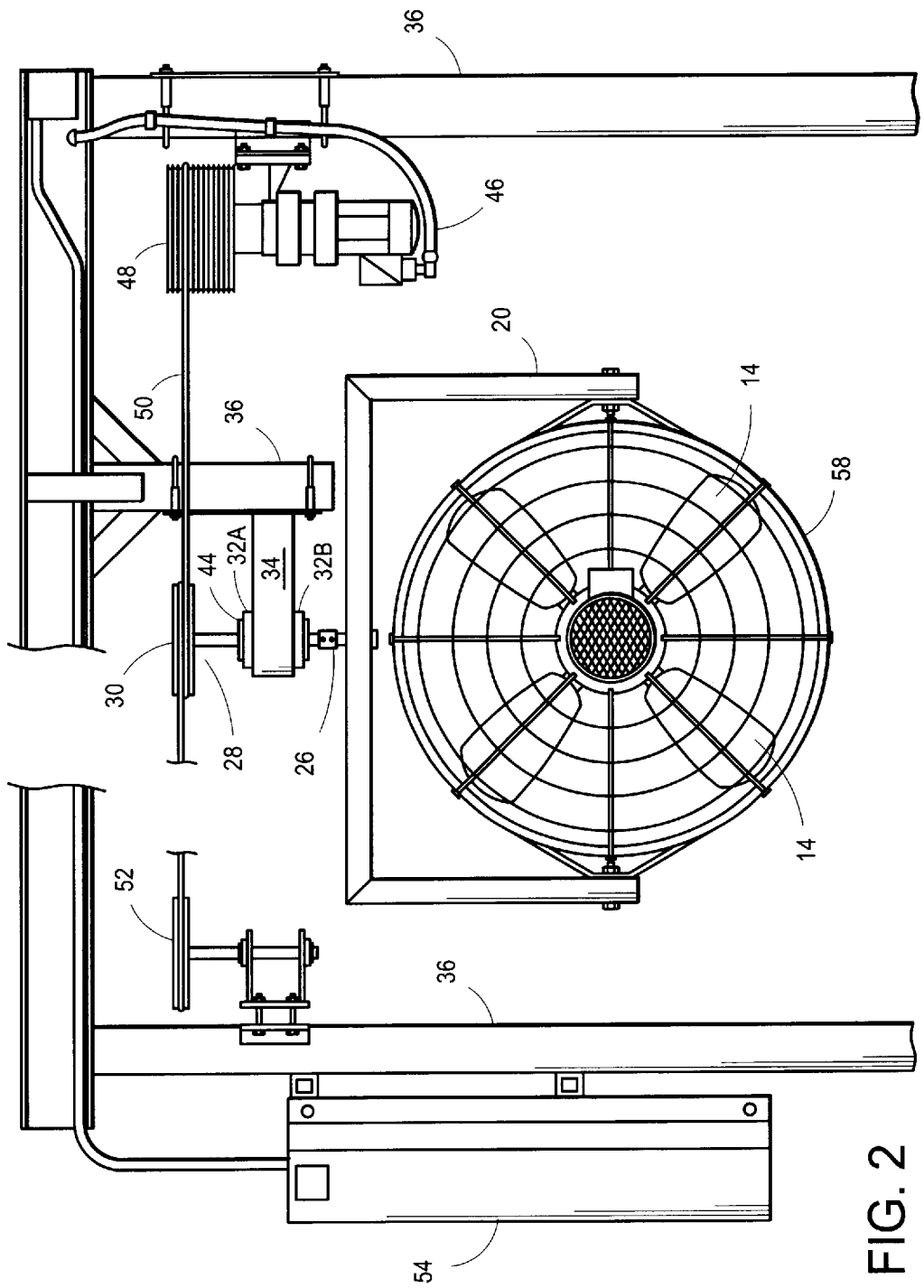
FIG. 2 is a front view of the disclosed livestock cooling fan.
Figure 3:
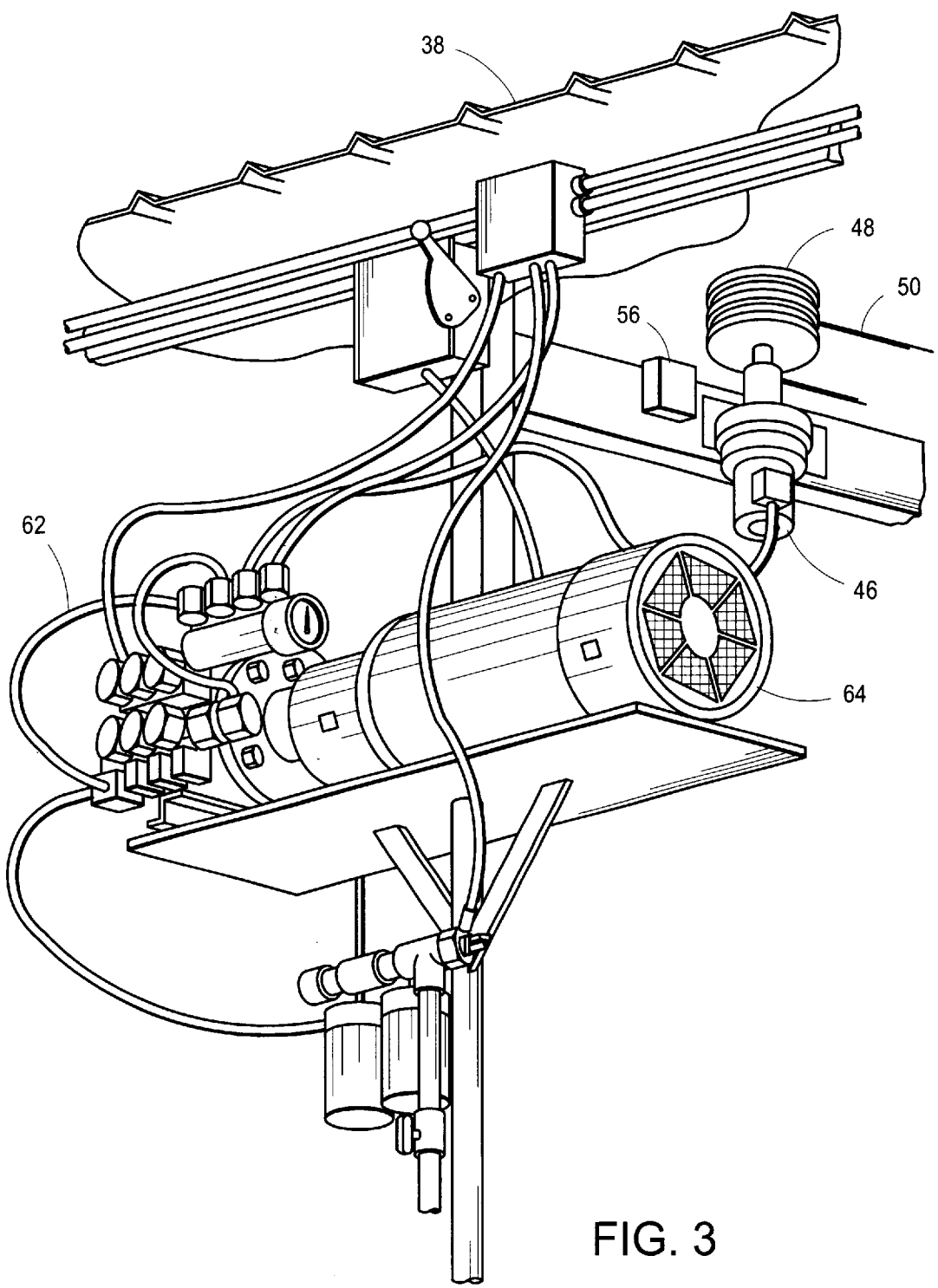
FIG. 3 is perspective view of one embodiment for placement of an oscillation motor and pump motor.

Drive shaft 24 is supported within bearing means 32. Bearing means 32 are supported attachment member 34, which is attached to a support means 36. As shown in FIG. 1 and FIG. 2, the attachment member may be attached to a variety of support means, including a structural member of a livestock protective structure, such as a barn or shade structure, where the structure has a roof 38 connected to support means 36.

The attachment member 34 may have a top 40 and a bottom 42. An aperture extends through the attachment member 34 from the top 40 to the bottom 42. The attachment member 34 may be constructed from square or rectangular iron stock. Attachment member 34 may be attached to support means 36 with U-bolts, or other suitable attachment means including bolting and welding. Bearing means 32 are disposed within the aperture of attachment member 34, where the bearing means and aperture are adapted for receiving drive shaft 24 therethrough.

First pulley 30 is attached to a second end 28 of drive shaft 24. A stop collar 44 or other retaining device is attached to drive shaft 24 above bearing means 32, such that the stop collar 44 or retaining device engages the top of bearing means 32 to support the weight of the fan 12 and the yoke 20. Oscillation means are connected to the first pulley 30 for rotating the first pulley 30, the drive shaft 24, the fan yoke 20 and the fan 12 through a plurality of rotational positions ranging up to a complete 360 degree rotation. The oscillation means may comprise an oscillation motor 46 attached to support means 36, where a second pulley 48 is operably connected to the oscillation motor 46, and cables 50 connect the second pulley 48 to the first pulley 30.

As depicted in FIG. 1 and FIG. 2, cables 50 form looped belts, which engage any one of the several grooves on first pulley 30 and second pulley 48. As further shown in FIG. 1 and FIG. 2, additional looped belt cables 50 may be attached to first pulley 30 and/or second pulley 48, thereby allowing a series of fans to be driven by a single oscillation motor 46. A third pulley 52, attached to support means 36, may be used to change the direction of the cables as required by the desired configuration of fans.

Bearing means 32 may comprise a first bearing 32A mounted on the top 40 of attachment member 34 and a second bearing 32B mounted on the bottom 42 of the attachment member 34. As an alternative, bearing means 32 may comprise a single bearing disposed within the aperture of the attachment member 34.

Oscillation motor 46 may be electrically connected to a variable frequency drive, such as a Series No. VSD07 manufactured by SQD. The variable frequency drive may be located within a local control panel 54. A programmable controller, such as a IDEC Microsmart series, may also be contained within the local control panel 54. The programmable controller may be equipped with a central processing unit, a real time clock module, a RS 485 module, an analog input and output module, digital input modules and digital output modules.

As an alternative embodiment to the system disclosed in FIGS. 1 and 2, a separate oscillation motor 46 may be directly attached to each drive shaft 24, eliminating the need for cables 50 or other linkage.

The rotational position of each fan 12 may be sensed by a position indication device 56, which may be mounted either at each individual fan 12 or, because fewer position indication devices 56 are required, at the oscillation motor 46 which drives a circuit of fans. The position indication device 56 is adapted to produce a signal in response to the rotation, i.e., oscillation, of the fan 12, as monitored directly from the fan 12, or in response to the rotation of the shaft of the oscillation motor 46. A position indication device 56 at either location will provide a signal indicating the rotational position of each fan 12 being oscillated by the oscillation motor 46. The output signal from the position indication device 56 may be transmitted to local control panel 54 or to a remote panel. An acceptable position indication device is a series 755 encoder available through Encoder Products Corp. of Sand Point, Id., or a Rotary Cam available through Electro Cam Corp. of Concord, Ontario.

The disclosed apparatus may also comprise means for injecting water droplets into the air stream 22 of the fan 12. One means of injecting water droplets into the air stream 22 comprises delivering water to a mist ring 58 of each fan 12 through a high pressure water line 48. Stainless steel or other corrosion resistant materials with acceptable pressures ratings are acceptable materials for construction of the mist ring 58. A plurality of nozzles are attached to the mist ring 58. The nozzles may be screwed into female connections which are welded to mist ring 58, or otherwise attached. Water is delivered into a high pressure water line 60 by a pump 62. Included among acceptable pumps are plunger pumps available through General Pump of Mendota Heights, Minn. or Cat Pumps of Minneapolis, Minn. Pump 62 is driven by pump motor 64. The pump flow rate of pump 62, and thus outlet pressure, may be controlled by various pressure control means. For example, the pump flow rate may be increased or decreased by controlling the revolutions per minute of motor 64 with a motor variable frequency drive, resulting in increased or decreased output pressure. The pump motor variable frequency drive may be located in local control panel 54. High pressure water line 60 may be equipped with a swivel to further enable the fan to rotate a complete 360 degrees. The lengths of water line 60 and the power line 66 to the motor should be sized to allow a complete 360 degree rotation.

When water droplets are injected into the air stream 22 of each fan 12, there is the possibility of creating a drench, a mist, or a fog, depending upon, among other factors, including environmental conditions, the volume of injected water, the injection pressure, and the droplet size. A drench showers the animal, wetting the animal to its skin, but is not normally a suitable cooling method when the animal is in its bedding area or is being milked. With a mist, the water droplets injected into the air stream 22 are smaller than with a drench, but the air becomes saturated with continued water injection, resulting in the animals and bedding becoming wet. A mist creates an undesirable water layer on the animal which acts as an insulator and retains heat. With fog, water is emitted through very small diameter nozzles at a sufficiently high pressure so as to result in extremely small water particles. These water particles will flash evaporate when the particles come into contact with any warm surface such as the skin of an animal or person, resulting in a cool animal environment with little wetting of the animal's hair-coat and virtually no wetting of the animal's bedding.

The disclosed cooling apparatus may be used with systems which monitor environmental conditions with environmental sensing devices, such as a temperature probes and/or a humidity probes, which transmit a signal to process control equipment, which provides an output signal to end devices which adjust water pressure and water volume accordingly. For example, the input to the process controller from a temperature probe may indicate the need for additional fog, so the process controller provides an output signal to a variable speed drive connected to pump motor 64, increasing pump speed so that additional water may be injected for generating fog. It has been found that a nozzle diameter of approximately 0.02 inches and injection pressures ranging from 500 to 1200 psi provide the desired water particle size of approximately 8 to 30 microns.

While the above is a description of various embodiments of the present invention, further modifications may be employed without departing from the spirit and scope of the present invention. For example, the size, shape, position and/or material of the various components may be changed as desired. Thus the scope of the invention should not be limited by the specific structures disclosed. Instead the true scope of the invention should be determined by the following claims.

What is claimed is:

1. A livestock cooling apparatus comprising:
   (a) a fan, the fan creating an air stream, said fan comprising a fan blade, a fan motor, and a fan enclosure, the fan blade operably attached to the fan motor, and the fan blade and fan motor mounted in the fan enclosure, the fan enclosure attached to a fan yoke;
   (b) a drive shaft having a first end and a second end, the first end coupled to the fan yoke;
   (c) an attachment member attached to a first support means, the attachment member having a top, a bottom, and an aperture extending through the attachment member from the top to the bottom;
   (d) bearing means attached to the attachment member, the bearing means disposed within the aperture, said bearing means and aperture adapted for receiving the drive shaft therethrough;
   (e) retaining means for securing the drive shaft within the bearing means;
   (f) a first pulley attached to the second end of the drive shaft; and
   (g) oscillation means connected to the first pulley for rotating the first pulley, drive shaft, fan yoke and fan through a plurality of rotational positions.

2. The apparatus of claim 1 wherein the oscillation means comprises a oscillation motor attached to a second support means, a second pulley operably connected to the oscillation motor, and cables connecting the second pulley to the first pulley.

3. The apparatus of claim 1 further comprising sensing means for determining the rotational position of the fan.

4. The apparatus of claim 3 further comprising programming means for setting the fan to oscillate between specific rotational positions.

5. The apparatus of claim 4 wherein the programming means further comprises a clock, and the programming means sets the fan assembly to oscillate between specific rotational positions according to a specific time.

6. The apparatus of claim 1 further comprising means for injecting water droplets into the air stream of the fan.

7. The apparatus of claim 6 wherein the means for injecting water droplets into the air stream of the fan comprises a pump coupled to a pump motor, the pump hydraulicly connected to a mist ring disposed within the air stream.

8. A livestock cooling apparatus comprising:
   (a) a livestock structure comprising a roof and supporting members, the roof connected to the supporting members;
   (b) an electrically-powered fan, said fan comprising a fan blade, a fan motor, and a fan enclosure, the fan blade operably attached to the fan motor, and the fan blade and fan motor mounted in the fan enclosure, the fan enclosure enclosed within a fan yoke;
   (c) a drive shaft having a first end and a second end, the first end coupled to the fan yoke;
   (d) an attachment member attached to a supporting member of the livestock structure, the attachment member having a top, a bottom, and an aperture extending through the attachment member from the top to the bottom;
   (e) bearing means attached to the attachment member, the bearing means disposed within the aperture, said bearing means and aperture adapted for receiving the drive shaft therethrough;
   (f) retaining means for securing the drive shaft within the bearing means;
   (g) a first pulley attached to the second end of the drive shaft; and
   (h) oscillation means connected to the first pulley for rotating the first pulley, drive shaft, fan yoke and fan through a plurality of rotational positions.

9. The apparatus of claim 8 wherein the oscillation means comprises a oscillation motor attached to a supporting member of the livestock structure, a second pulley operably connected to the oscillation motor, and cables connecting the second pulley to the first pulley.

10. The apparatus of claim 8 further comprising sensing means for determining the rotational position of the fan.

11. The apparatus of claim 10 further comprising programming means for setting the fan to oscillate between specific rotational positions.

12. The apparatus of claim 11 wherein the programming means further comprises a clock, and the programming means sets the fan assembly to oscillate between specific rotational positions according to a specific time.

13. The apparatus of claim 8 further comprising means for injecting water droplets into the air stream of the fan.

14. The apparatus of claim 13 wherein the means for injecting water droplets into the air stream of the fan comprises a pump coupled to a pump motor, the pump hydraulicly connected to a mist ring disposed within the air stream.

15. A livestock cooling apparatus comprising:
   (a) a livestock structure comprising a roof and supporting members, the roof connected to the supporting members;
   (b) an electrically-powered fan, said fan creating an air stream, said fan comprising a fan blade, a fan motor, and a fan enclosure, the fan blade operably attached to the fan motor, and the fan blade and fan motor mounted in the fan enclosure, the fan enclosure attached to a fan yoke;
   (c) a drive shaft having a first end and a second end, the first end coupled to the fan yoke;
   (d) a four-sided hollow attachment member attached to a supporting member of the livestock structure, the attachment member having a top, a bottom, and an aperture extending through the attachment member from the top to the bottom;
   (e) a first support bearing attached to the top of the attachment member, the first support bearing disposed adjacent to the aperture, said first support bearing adapted for receiving the drive shaft therethrough;
   (f) a second support bearing attached to the bottom of the attachment member, the second support bearing disposed adjacent to the aperture, said second support bearing adapted for receiving the drive shaft therethrough;
   (g) a stop collar attached to the drive shaft, the stop collar engaging the first support bearing;
   (h) a first pulley attached to the second end of the drive shaft; and (i) oscillation means connected to the first pulley for rotating the first pulley, drive shaft, fan yoke and fan through a plurality of rotational positions.

16. The apparatus of claim 15 wherein the oscillation means comprises a oscillation motor attached to a second support means, a second pulley operably connected to the oscillation motor, and cables connecting the second pulley to the first pulley.

17. The apparatus of claim 15 further comprising sensing means for determining the rotational position of the fan.

18. The apparatus of claim 17 further comprising programming means for setting the fan to oscillate between specific rotational positions.

19. The apparatus of claim 18 wherein the programming means further comprises a clock, and the programming means sets the fan assembly to oscillate between specific rotational positions according to a specific time.

20. The apparatus of claim 15 further comprising means for injecting water droplets into the air stream of the fan.

21. The apparatus of claim 20 wherein the means for injecting water droplets into the air stream of the fan comprises a pump coupled to a pump motor, the pump hydraulicly connected to a mist ring disposed within the air stream.

* * * * *